United States Patent
Makino

[11] 3,727,118
[45] Apr. 10, 1973

[54] CONTACTLESS REVERSIBLE DEVICE IN AN ELECTRIC CAR

[75] Inventor: Noriaki Makino, Kyoto, Japan
[73] Assignee: Nippon Yusoki Co., Ltd., Kyoto, Japan
[22] Filed: May 26, 1970
[21] Appl. No.: 40,650

[30] Foreign Application Priority Data

Dec. 10, 1969 Japan.............................44/117790
Dec. 10, 1969 Japan.............................44/117791

[52] U.S. Cl.................318/297, 318/300, 321/45 C
[51] Int. Cl. .............................................H02p 5/16
[58] Field of Search....................318/257, 297, 246, 318/252, 351, 356; 321/45 C

[56] References Cited

UNITED STATES PATENTS

| 3,302,089 | 1/1967 | Rosa et al. | 318/356 X |
| 3,191,113 | 6/1965 | Gargani | 318/297 |
| 3,349,314 | 10/1967 | Giannamore | 321/45 C |

Primary Examiner—Bernard A. Gilheany
Assistant Examiner—W. E. Duncanson, Jr.
Attorney—Sughrue, Rothwell, Mion, Zinn & Macpeak

[57] ABSTRACT

A contactless reversible device in an electric car in which an armature of a direct current electric motor is connected to two series field coils wound in opposite directions. A blocking diode is connected in series with a main thyristor which is connected to the other end of the series of field coils, and two capacitors are connected to the anodes of the thyristors. An auxiliary thyristor is connected in parallel with a series connection of a transformer and reverse charging diode and the series-parallel circuit is connected between the intermediate of the connection of the capacitors and the cathodes of the main thyristors. The other end of the transformer is connected to the negative terminal of the battery, the other end of the armature is connected to the positive terminal of the battery, and flywheel diodes are connected to the positive terminal of the battery and the anodes of the blocking diodes.

7 Claims, 6 Drawing Figures

INVENTOR
NORIAKI MAKINO

CONTACTLESS REVERSIBLE DEVICE IN AN ELECTRIC CAR

BACKGROUND OF THE INVENTION

1. Field of the Invention

This invention relates to a contactless reversible device with a thyristor control in an electric car.

2. Description of the Prior Art

In the conventional reversible drive operating device of a direct current electric motor for an electric car, the armature, the series field coil and its respective contactors, a thyristor circuit, and a battery are connected in series with each other. A flywheel diode is connected to both the positive terminal of the battery and anode of the thyristor circuit. When either contactor is switched the thyristor circuit is also switched and the electric motor operates. The flywheel diode provides for a smooth current flow through the motor. To reverse the operation of the motor, the contactors are switched so as to reverse the magnetic field of the series field thereby reversing the torque of the motor. Since the contactors are used in the operation of the motor, there are problems of durability, maintenance and misoperation of the thyristor circuit due to the surge upon the opening and closing of the contactors.

In another conventional reversible drive operating device of the motor, one side of the armature is connected to one side of a bridge of thyristors, a series field coil is connected across the bridge, and the other side of the bridge is connected to a thyristor circuit. A battery is connected across the other side of the armature and the other terminal of the thyristor circuit. A flywheel diode is connected both to the positive terminal of the battery and the anode of the thyristor circuit. When two diagonally opposite thyristors of the bridge circuit are fired at the same time so that the thyristor circuit is switched, the electric motor is driven. If these two thyristors are shut off while the other two diagonal thyristors are fired at the same time, the electric motor is then driven in the reverse direction. If follows therefore that the electric motor may be reversed by completing a circuit through the proper combination of thyristors in the bridge circuit. Since this contactless reversible device requires in addition to the thyristor circuit, four thyristors of large current capacity for operating the motor, the device becomes larger in size and subject to misoperation due to noise which may cause the series field coil to short-circuit, and it therefore becomes necessary to protect the armature and thyristor circuit from the short-circuited current.

Further, in conventional protection of electric car motor devices against failure to turn off the thyristor control, the armature of the motor, a pair of contactors connected in parallel with each other with the series field coil connected therebetween, and a thyristor circuit are connected in series across the terminals of a battery. A flywheel diode is connected between the positive electrode of a battery and the anode of the thyristor circuit and a circuit breaker, a forward or backward directional switch, and the relay coils of the contactors are connected in series across the terminals of the battery. The output terminals of a control pulse generator are connected to the thyristor circuit, the input terminal of a detector is connected to the anode of the thyristor circuit, and the output terminal of the detector is connected to the circuit breaker. The output terminal of a reset switch is also connected to the circuit breaker. If the forward or backward directional switch is switched to the forward drive side, a relay coil is energized, thereby operating one of the contactors. In such a state, assume that the thyristor circuit fails to turn off. If an ON pulse is supplied from the terminal of the control pulse generator to the thyristor circuit and an OFF pulse is supplied from the terminal of the control pulse generator to the thyristor circuit, the detector operates the breaker so that current through the relay coil is stopped with the result that the contactor is tripped to shut off the motor current. Even if the cause of the failure to turn off is removed, the breaker remains operated, and the relay coil is not energized, accordingly the device does not return to its state. In order to return the device to its normal state the reset switch must be operated so as to reset the breaker. Thus, if the turning off of the thyristor control fails in this device the motor current is at once shut off, and either of the contactors may be damaged. If a contactor is damaged, it tends to fail to turn off because of surges upon opening and closing of the contactors and the capability of shutting off the motor current upon failure of the thyristor control to turn off tends to be lowered, and even if the cause of the failure to turn off is removed after the contactors are tripped, it cannot return to the normal state unless the reset is operated. Therefore, the primary object of this invention is to eliminate the disadvantages of the conventional reversible device in an electric car and to provide a novel and improved contactless reversible device for the thyristor control of an electric motor used in an electric car which is adapted to provide ease of maintenance and high reliability with the use of a simple circuit arrangement.

According to one aspect of the present invention, there is provided a contactless reversible switch circuit in an electric motor used in an electric car which comprises a direct current electric motor having two series field coils wound in opposite directions. The motor armature is connected to both of the series coils, a first blocking diode connected to one of the series field coils, a first main thyristor connected in series with the blocking diode, a second blocking diode connected to the other end of the other series field coils, and a second main thyristor connected in series with said second blocking diode. Two capacitors are each connected to the anode of one of the thyristors respectively, an auxiliary thyristor is connected between the capacitors and the cathode of said main thyristors. A transformer and a reverse charging diode are connected in series with each other and both are connected parallel with said auxiliary thyristor. The invention further comprises a direct current source of power, the transformer connected to the negative terminal of said source, the armature connected to the positive terminal of said source, and two flywheel diodes connected to the positive terminal of said source and the anodes of said blocking diodes, respectively.

According to another aspect of the present invention, there is provided an automatic resetting device upon failure to turn off a thyristor control of an electric motor in an electric car which comprises a direct current electric motor having two series field coils wound in opposite directions, the motor armature being connected to both said series coils. The device further comprises a first blocking diode connected to one of the series field coils, a first main thyristor connected in series with the blocking diode, a second blocking diode connected to the other of the other series field coils, a second main thyristor connected in series with said second blocking diode. Two serially connected capacitors are connected to the thyristors at the anodes thereof, an auxiliary thyristor is connected between the intermediate connection point of two serially connected capacitors and the cathodes of said main thyristors. A transformer and a reverse charging diode are connected in series with each other and also connected in parallel with the auxiliary thyristor. The device further comprises a direct current source of power, the transformer being connected to the negative terminal of the source, and the armature of the electric motor connected to the positive terminal of the source. A first flywheel diode is connected between the positive terminal of the source and the anode of the first blocking diode and a second flywheel diode is connected between the positive terminal of the source and the anode of said second blocking diode. The device further includes a control pulse generator having first, second and third output terminals wherein the first output terminal is connected for firing the first main thyristor, the second output terminal is connected for firing the second main thyristor, and the third output terminal is connected for firing the auxiliary thyristor; a relaxation oscillator having first, second and third output terminals wherein the first output terminal is connected for firing the first thyristor, the second output terminal is connected for firing the second thyristor, and the third output terminal is connected for firing the auxiliary thyristor; and a detector having two input terminals which are connected to the respective anodes of the main thyristors and an output terminal which is connected to the relaxation oscillator.

BRIEF DESCRIPTION OF THE DRAWINGS

The other features and advantages of the present invention will become apparent from the foregoing description taken in conjunction with the accompanying drawings, in which.

DESCRIPTION OF THE PREFERRED EMBODIMENTS

For a clear understanding of the contactless reversible device of this invention, the conventional reversible devices will now be described with reference to FIGS. 1 and 2, which show typical conventional contact and contactless reversible switch circuits used in an electric car.

Figure 1:
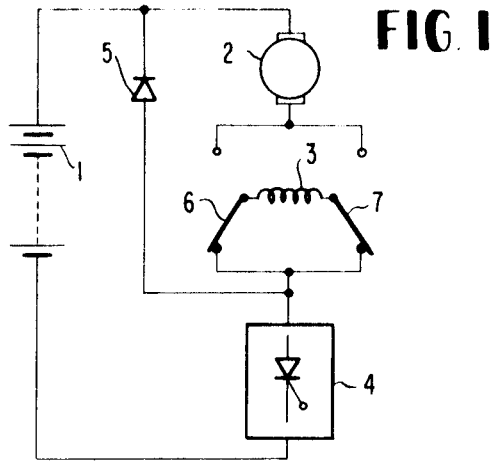
FIG. 1 is a wiring diagram of one example of the conventional contact reversible switch circuit in an electric motor.

The reversible drive operating device used for the conventional direct current series motor for an electric car shown in FIG. 1 has a battery 1, an armature 2 of the direct current motor, a series field coil 3, a thyristor circuit 4, a flywheel diode 5, and contactors 6 and 7 used for reversing the rotating direction of the electric motor.

In connection of such a device, the armature 2, series field coil 3 through the contactors 6 and 7, and thyristor circuit 4 are connected in series with each other across the terminals of the battery 1, and the flywheel diode 5 is connected to both the positive terminal of the battery 1 and the anode of the thyristor circuit 4.

In operation of this conventional device, when either contactor 6 or 7 is switched and the thyristor circuit 4 is also switched, the electric motor is driven. Flywheel diode 5 provides smooth current flow through the motor when the current direction is reversed. In order to reverse the operation of the electric motor, the contactor 6 or 7 is switched so as to reverse the magnetic field of the series field 3 to reverse the torque of the electric motor. Since this device uses the contactors 6 and 7, there are problems of durability, maintenance and misoperation of the thyristor circuit due to the surge upon opening and closing of the contactors.

Figure 2:
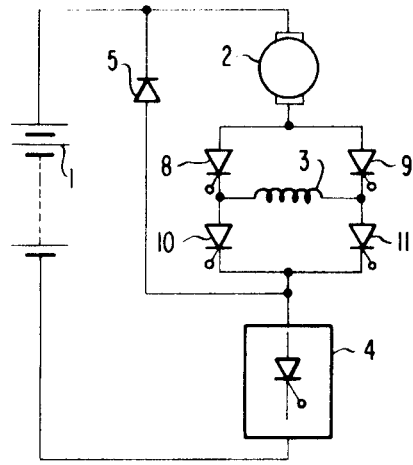
FIG. 2 is a wiring diagram of another example of the conventional contactless reversible switch circuit used in an electric car.

Reference is now made to FIG. 2, which also shows another example of the conventional contactless reversible device intended to overcome the aforementioned disadvantages of the first example of the conventional device wherein the like parts and components are designated by the same reference numerals as those in FIG. 1.

This contactless reversible device has in addition to the parts and components contained in the previous example thyristors 8, 9, 10 and 11 connected in a bridge circuit for reversing the electric motor. The armature 2 is connected to one side of the bridge of thyristors 8, 9, 10 and 11, the series field coil 3 is connected across the bridge, the other side of the bridge is connected to the thyristor circuit 4, and the battery 1 is connected across the armature 2 and the thyristor circuit 4. The flywheel diode 5 is connected both to the positive terminal of the battery 1 and the anode of the thyristor circuit 4.

In operation of this conventional device, when the thyristors 8 and 11 are fired at the same time the thyristor circuit 4 is switched, the electric motor is driven. On the other hand, if the thyristors 8 and 11 are shut off and thyristors 9 and 10 are fired at the same time the thyristor circuit 4 is switched, the electric motor is driven in the reverse direction. If follows that the electric motor may be reversed by the combinations of the thyristors 8 and 11 or 9 and 10. The other operation thereof is the same as that shown in FIG. 1. Since this contactless reversible device requires in addition to the thyristor circuit 4, four thyristors of large current capacity, the device becomes larger in size and yet as it fails to operate normally due to the noise so that the series field coil may be short-circuited, and protection from the short-circuited current is required for the armature 2 and thyristor circuit 4.

Figure 3:
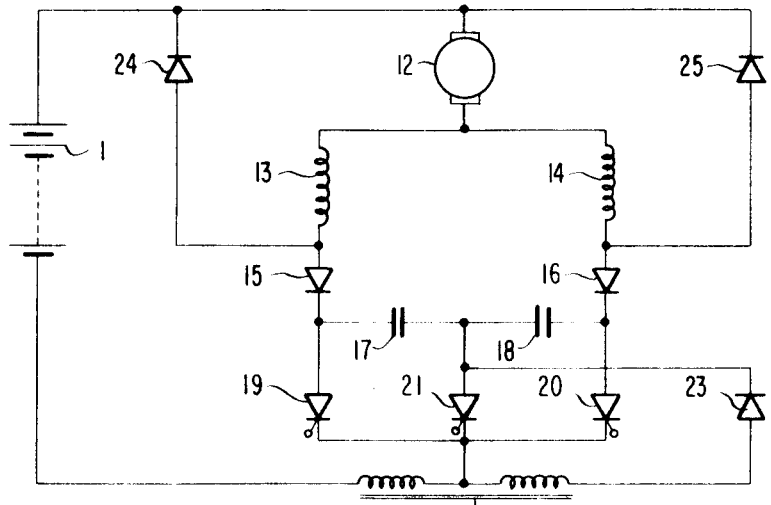
FIG. 3 is a wiring diagram of one embodiment of a contactless reversible device in an electric car according to this invention.

Referring now to FIG. 3, which shows one embodiment of a contactless reversible device constructed in accordance with this invention wherein the like parts and components are designated by the same reference numerals as those in FIGS. 1 and 2. It comprises a direct current electric motor having two series field coils 13 and 14 wound in opposite directions, an armature 12 connected to both of the series coils 13 and 14, a blocking diode 15 connected to one end of the series field coil 13, a main thyristor 19 connected in series with the blocking diode 15, a blocking diode 16 connected to one end of the series field coil 14, and a main thyristor 20 connected in series with the blocking diode 16. Two serially connected capacitors 17 and 18 are connected at both ends of the anodes of the thyristors 19 and 20, respectively, an auxiliary thyristor 21 is connected between the connection of the capacitors 17 and 18 and the cathodes of the main thyristors 19 and 20, transformer 22 and a reverse charging diode 23 are connected in series with each other and both connected in parallel with the auxiliary thyristor 21. The transformer 22 is connected to the negative terminal of a direct current source 1, and the armature 12 is connected to the positive terminal of the source 1. Two flywheel diodes 24 and 25 are connected to the positive terminal of the source 1 and the anodes of the blocking diodes 15 and 16, respectively.

In the operation of this invention, when the auxiliary thyristor 21 is at first fired, the capacitors 17 and 18 are charged in the positive going direction. When the charging is completed, the auxiliary thyristor 21 is turned off. In this state, if the main thyristor 19 is fired, the electric motor current will flow from the battery 1 through the armature 12, series field coil 13, blocking diode 15, main thyristor 19, transformer 22, to the battery 1 to supply a power to the electric motor. At the same time, the potential of the capacitor 17 is reversed by the loop of capacitors 17, main thyristor 19, transformer 22, and reverse charging diode 23. This means that the capacitor 17 is reversely charged. When the auxiliary thyristor 21 is fired after a predetermined time $T_{on}$ after the main thyristor 19 is fired, the voltage of the capacitor 17 is applied as a reverse voltage with respect to the main thyristor 19, with the result that the main thyristor 19 is turned off. As the capacitor 17 is discharged in reverse direction, it is charged in normal charging direction. If thereafter the main thyristor 19 is fired after a predetermined time $T_{off}$, the aforementioned operation will be repeated. If the ratio of the time $T_{on}$ to $T_{off}$ is properly adjusted, the speed of the electric motor may be controlled. In the above state, the rotating direction is determined depending upon the magnetic field of the series field coil 13.

If the main thyristor 20 is fired and the auxiliary thyristor 21 is fired so that the capacitors 17 and 18 are charged in normal direction, the electric motor current will flow from the battery 1 through the armature 12, series field coil 14, blocking diode 16, main thyristor 20, transformer 22 to the battery 1. At the same time, the potential of the capacitor 18 is reversed by the loop having the oscillating circuit of the capacitor 18, main thyristor 20, transformer 22, reverse charging diode 23, and capacitor 18. If the auxiliary thyristor 21 is fired after a predetermined time $T_{on}$ after the main thyristor 20 is fired, the main thyristor 20 is turned off by the reverse charge of the capacitor 18. As the capacitor 18 is discharging in the reverse direction, it is charged in the normal direction. If the main thyristor is fired after a predetermined time $T_{off}$ thereafter, the similar operation to the above will be repeated. It follows that if the ratio of the time $T_{on}$ to $T_{off}$ is appropriately adjusted, the speed of the electric motor may be controlled. In such a state, the rotating direction of the electric motor is determined by the magnetic field of the series field 14.

The flywheel diodes 24 and 25 are provided for effecting the smooth flow of current upon switching, and the blocking diodes 15 and 16 are provided for maintaining the charge on capacitors 17 and 18.

From the foregoing description it can readily be seen that the rotating direction and speed of the electric motor is determined by energizing either of the series field 13 or 14, or by firing either the main thyristor 19 or 20.

It is understood that since this invention provides a contactless reversible speed control of the direct current electric motor by means of the thyristor control device operating both as a split motor and as a contactless reversible switch, it may eliminate the trouble based on the reversible contactors for the electric motor, the maintenance problems and in addition improve the ease of the maintenance and reliability by the simple circuit arrangements.

Figure 4:
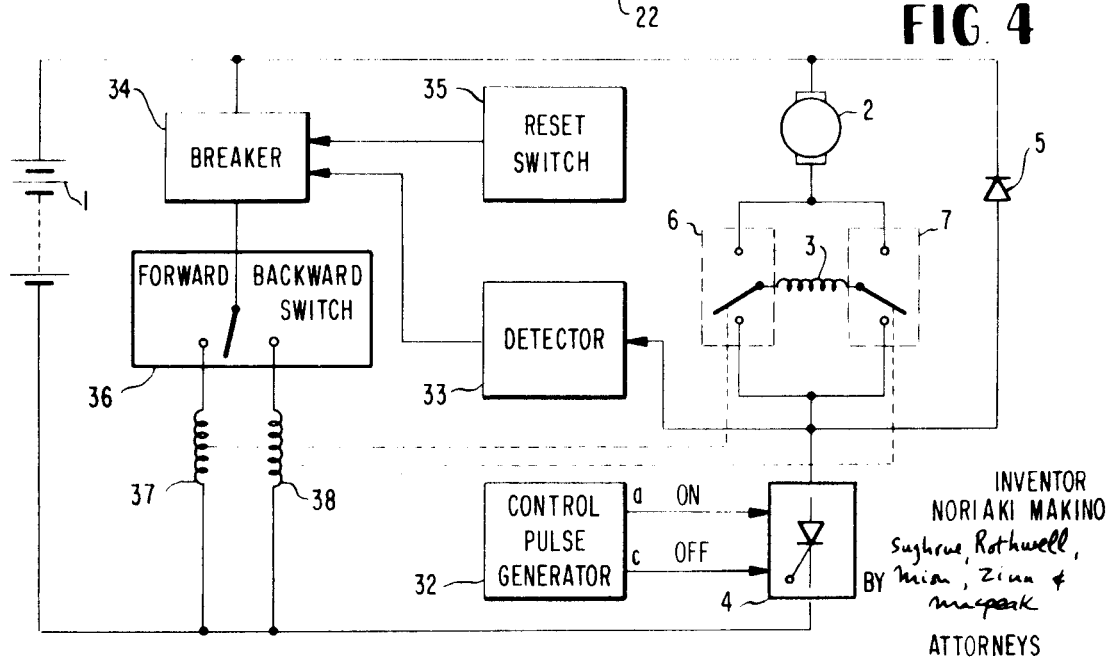
FIG. 4 is a wiring diagram of one example of a protection device upon failure to turn off a thyristor control used in the conventional electric car.

For further clear understanding of this invention, another example of the conventional reversible device with a protection means upon failure to turn off the thyristor control will be described with reference to FIG. 4 which shows an example of the conventional device with the conventional protection device for failure to turn off a thyristor control used in the conventional electric car wherein the like parts and components are designated by the same reference numerals as those in the previous conventional devices shown in FIGS. 1 and 2.

This device has a battery 1, a control pulse generator 32 from which an ON pulse is distributed from a terminal a and an OFF pulse is delivered from a terminal c as outputs thereof, a detector 33 for a failure to turn off current. The device further comprises a breaker 34, a reset switch 35, a forward or backward drive switch 36, a relay coil 37 of a magnet switch for forward drive, a relay coil 38 of a magnet switch for backward drive. The device also includes an armature 2 of the direct current electric motor, a series field coil 3 of the electric motor, a contactor 6 of the magnet switch for forward drive, a contactor 7 of the magnet switch for backward drive, a thyristor circuit 4, and a flywheel diode 5.

In the circuit of this conventional device, a series circuit of the armature 2 of the electric motor, contactors 6 and 7 connected in parallel with each other through the series field coil 3 and thyristor circuit 4 are connected across the terminals of the battery 1. The flywheel diode 5 is connected between the positive electrode of the battery 1 and the anode of the thyristor circuit 4. The breaker 34, forward or backward drive switch 36, and the relay coils 37 and 38 are connected in series with each other across the terminals of the battery 1. The output terminals a and c of the control pulse generator 32 are connected to the thyristor circuit 4. The input terminal of the detector 33 is connected to the anode of the thyristor circuit 4, and the output terminal of the detector 33 is connected to the breaker 34, with the output terminal of the reset switch 35 being connected to the breaker 34.

In operation of this conventional device, if the forward or backward switch 36 is switched to the forward drive side, the relay coil 37 is excited, thereby operating contactor 6. In such a state, assume that the thyristor circuit 4 fails to turn off. In an ON pulse is supplied from the terminal a of the control pulse generator 32 to the thyristor circuit 4 and an OFF pulse is supplied from the terminal c of the control pulse generator 32 to the thyristor circuit 4, the detector 33 operates to operate the breaker 34 so that the relay coil 37 unlatches contactor 6 to shut off the motor current. Even if the cause of the failure to turn off is removed, since the breaker 34 remains operated, the relay coil is not excited with the result that the device does not return to the normal state. In order to return the device to the original state, the reset switch 35 must be operated so as to reset the breaker 34.

If the reversal of current fails in the conventional device, due to the fact that the motor current is at once shut off, the contactor 6 and 7 may be damaged by the surge upon opening and closing of the contactors and the capability of shutting off the motor current upon failure to turn off the thyristor tends to be lowered, and even if the cause for the failure to turn off is removed after the contactors 6 or 7 are tripped, the circuit cannot return to the normal state until reset.

Figure 5:
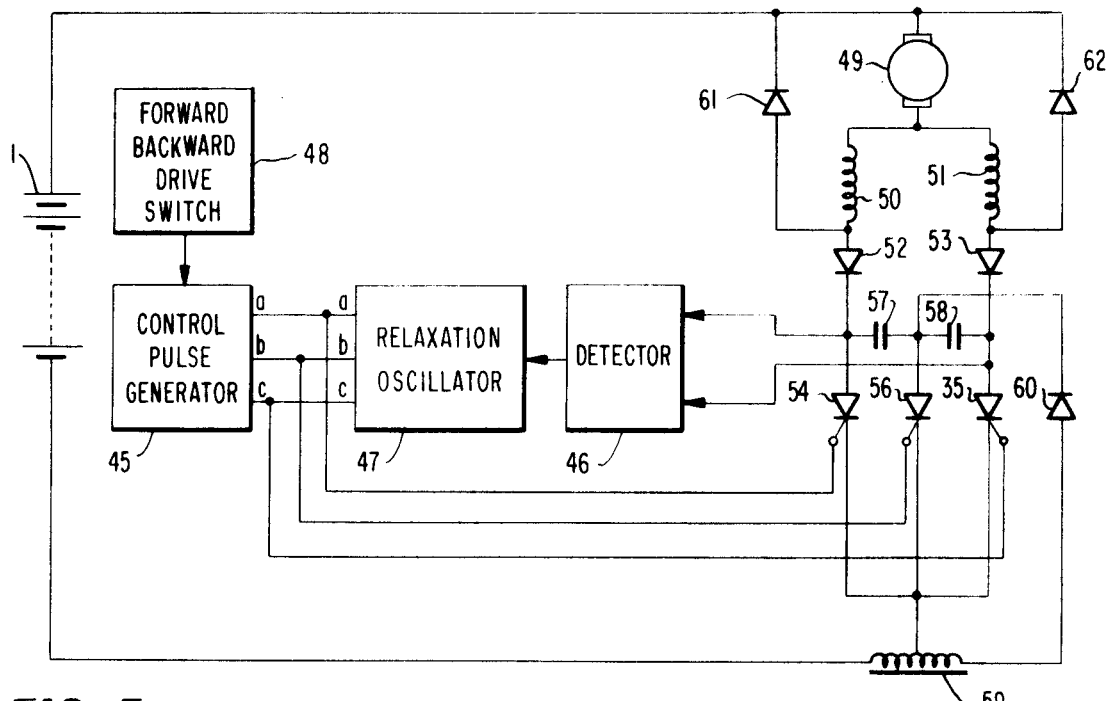
FIG. 5 is a wiring diagram of another embodiment of the device with a protection device upon failure to turn off a thyristor control according to this invention.

Reference is now made to FIG. 5 which shows a further embodiment of the reversible device with a protection device against failure to turn off the thyristor.

This automatic resetting device upon failure to turn off a thyristor control in an electric car comprises a direct current electric motor having two series field coils 50 and 51 wound in opposite directions, an armature 49 connected to the series coils 50 and 51, a blocking diode 52 connected to the series field coil 50, a main thyristor 54 connected in series with the blocking diode 52. The device further comprises a blocking diode 53 connected to the series field coil 51, a main thyristor 55 connected in series with the blocking diode 53, two capacitors 57 and 58 connected in series with each other and also connected between the thyristors 54 and 55 at anodes thereof, an auxiliary thyristor 56 connected between the intermediate connection point of the capacitors 57 and 58 and the cathodes of the main thyristors 54 and 55. A transformer 59 and a reverse charging diode 60 are connected in series with each other and also connected in parallel with the auxiliary thyristor 56. The device also includes a direct current source of power or battery 1, with the transformer 59 connected to the negative terminal of the battery 1, and the armature of the electric motor connected to the positive terminal of the battery 1. A flywheel diode 61 is connected between the positive terminal of the battery 1 and the anode of the blocking diode 52, a second flywheel diode 62 is connected between the positive termianl of the battery 1 and the anode of the blocking diode 53. The device further comprises a control pulse generator 45 having output terminals a, b and c wherein the terminal a is connected for firing the main thyristor 54, the terminal b is connected for firing the main thyristor 55, and the terminal c is connected for firing the auxiliary thyristor 56; a relaxation oscillator 47 having output terminals a, b and c wherein the terminal a is connected for firing the thyristor 54, the terminal b is connected for firing the thyristor 55, and the terminal c is connected for firing the auxiliary thyristor 56; and a detector 46 having two input terminals which are connected to the respective anodes of the main thyristors 54 and 55 and one output terminal which is connected to the relaxation oscillator 47.

In the operation of this invention, when the forward or backward drive switch 48 is switched to the forward drive side, an ON pulse is delivered from the output terminal a of the control pulse generator 45 and an OFF pulse is delivered from the output terminal c of the control pulse generator 45. Assume that the control pulse generator 45 always generates an OFF pulse from the terminal c prior to an ON pulse from the terminal a, the auxiliary thyristor 56 is fired by OFF pulse so that the capacitors 57 and 58 are charged in a positive going direction. When the capacitors 57 and 58 are charged up, the auxiliary thyristor 56 is self-turned off. Then, if ON pulse is generated from the output terminal a of the control pulse generator 45, the main thyristor 54 is fired so that the motor current will flow from the battery 1 through the armature 49, series field coil 50, blocking diode 52, main thyristor 54, and transformer 59. At the same time the potential of the capacitor 57 is reversed by the closed loop of an oscillating circuit having the capacitor 57, main thyristor 54, transformer 59, and reverse charging diode 60. If follows therefore that the capacitor 57 is reversely charged. Then, an OFF pulse is generated from the output terminal c of the control pulse generator 45, the voltage of capacitor 57 is applied with a reverse voltage with respect to the main thyristor 54 and accordingly the main thyristor 54 is turned off. The capacitor 57 is discharged of the reverse charge at the same time it is charged in the normal direction. The speed control of the electric motor becomes possible by the generation of alternate ON-OFF pulses.

If the thyristor control device fails to turn off, the failure detector 46 is operated so that the relaxation oscillator 47 is operated. When an ON pulse output is generated from the terminal a of the control pulse generator 45, the oscillation will occur in a sequence of c-b-ca-c-b. Since the main thyristor 54 is in the conducting state due to the failure to turn off and the reverse charges of the capacitor 57 are already discharged, the main thyristor 54 is not turned off by the oscillation output c. Then the main thyristor 55 is fired by the oscillation output b. At the same time since the composite capacity of the capacitors 57 plus 58 applies reverse voltage to the main thyristor 54, and the main thyristor 54 is turned off. If the main thyristor 55 is fired, the motor current flows from the battery 1 through the armature 49, series field coil 51, blocking diode 53, main thyristor 55, and transformer 59 to the battery 1. From this flow, the torque is generated in the electric motor in the backward direction. At the same time the potential of the capacitor 58 is reversed by the oscillation circuit having the capacitor 58, main thyristor 55, transformer 59, and reverse charging diode 60. Then, when an OFF pulse is generated from the output terminal c of the relaxation oscillator 57, the auxiliary thyristor 56 is fired so that the voltage of the capacitor 58 is applied as a reverse voltage with respect to the main thyristor 55 with the result that the main thyristor 55 is turned off, and the device is returned to its normal state. When it is returned to the normal state, the detector 46 is de-energized so that the relaxation oscillator 47 stops oscillating. Thereafter, normal operation may be effected by the control pulse generator 45. The reverse torque applied to the electric motor is of an extremely short time and accordingly no trouble occurs in actual operation.

If the forward or backward drive switch 48 is switched to the backward drive side, an ON pulse is generated from the output terminal b and an OFF pulse is generated from the output terminal c of the control pulse generator 45. Accordingly, the main thyristor 55 is switched, but the operation thereof is the same as in the forward drive. Upon failure to turn off the main thyristor 55, the oscillation will occur in the relaxation oscillator 47 in the sequence of c-a-c-b-c-a. It follows that the output terminal a is substituted by the terminal c. The operation of the device upon failure to turn off is also the same as that in the forward drive operation. The operation of automatic reset of failure to turn off in the device of this invention will now be described with reference to FIG. 6, in which D shows the pulse output waveforms of the control pulse generator 45 wherein a designates the pulse waveform to fire the main thyristor 54, b designates the pulse waveform to fire the main thyristor 55, and c designates the pulse waveform to fire the auxiliary thyristor 56; E shows noise waveforms generated in external relation wherein a designates the noise waveform to fire the main thyristor 54, b designates the noise waveform to fire the main thyristor 55, and c designates the noise waveform to fire the auxiliary thyristor 56; F shows the oscillation waveforms of the relaxation oscillator 47 wherein a designates the pulse waveform to fire the main thyristor 54, b designates the pulse waveform to fire the main thyristor 55, and c designates the pulse waveform to fire the auxiliary thyristor 56; G shows the waveforms of both terminals of the main thyristor 54, H shows the waveforms of both terminals of the main thyristor 55, and I shows the required capacitors 57 and 58 for firing either the main thyristor 54 or 55 when conducting. A, B and C show the various conditions of automatic reset upon failure to turn off the main thyristors 54 and 55; the dotted lines show initial time for operating the detector 46 for failure to turn off. The operation waveform of automatic reset upon failure to turn off in the device of this invention will now be described in the following: Prior to initiating the operation, the failure to turn off is considered generally in any thyristor control, it is not a failure to turn off but the impossibility of reversal of current due to overload. This is a design error. Here, such a lack of current reversal capability is excluded as for the cause of the failure to turn off, and in the case of having a capability of reversal, the state of impossibility to turn off is considered to be the failure.

Figure 6:
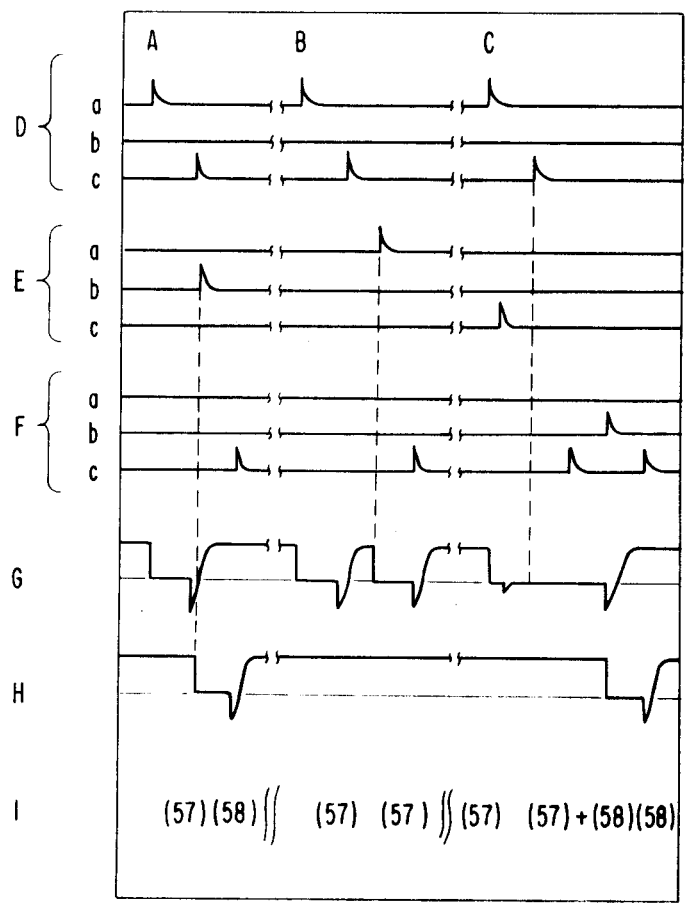
FIG. 6 is a diagram of waveforms of operation upon failure to turn off in the device of FIG. 5.

In the case A in FIG. 6, the main thyristor 54 is fired by the pulse shown by Da of the control pulse generator 45 and the main thyristor 54 is turned off by the pulse shown by Dc of the control pulse generator 45, whereupon the capacitor 57 starts charging. As soon as it is turned off, if the main thyristor 55 is fired by the noise shown by Eb, the relaxation oscillator 47 is oscillated and accordingly the main thyristor 55 is turned off by the oscillation output Fc, and capacitor 58 is charged. The waveforms of both ends of the main thyristor 54 in the above process are shown in H in FIG. 3.

In the case B in FIG. 6, the main thyristor 54 is fired by the pulse shown by Da of the control pulse generator 45 and the main thyristor 54 if turned off by the pulse shown by Dc of the control pulse generator 45, whereupon the capacitor 57 is charged. After it is turned off, the main thyristor 54 is fired by the noise Ea, so that the relaxation oscillator 47 is oscillated with the result that the main thyristor 54 is turned off by the oscillation output Fc and the capacitor 57 is charged. The waveforms of both ends of the main thyristor 54 are shown in G and the waveforms of both ends of the main thyristor 55 are shown in H.

In the case C in FIG. 6, the main thyristor 54 is fired by the pulse shown by Da of the control pulse generator 45 and the auxiliary thyristor 56 is fired by the noise Ec. If the noise Ec is generated, when the reverse charging of the capacitor 57 is not completed, the main thyristor 54 is not turned off due to the lack of the reverse charge. It follows that the charge of the capacitor 57 is discharged in both normal and reverse directions. Then, since the capacitor 57 is not reversely charged by the pulse Dc of the control pulse generator 45, the main thyristor 54 is not turned off so that the turn-off fails and accordingly the relaxation oscillator 47 oscillates and since the capacitor 57 is not reversely charged, the main thyristor 54 is not turned off even by the oscillating output Fc. The main thyristor 55 is fired by the following oscillating output Fb. At the same time, since the composite charge capacitors 57 plus 58 is supplied as reverse charges, the main thyristor 54 is turned off and the capacitor 58 is reversely charged. Then, the main thyristor 55 is turned off by the oscillating output Fc. The capacitor 58 is operating.

It is clearly understood from the foregoing description that the automatic reset device of this invention automatically resets to the normal state the motor and thyristor control device, and eliminates the problems of defects of the contactor due to the trip upon the failure to turn off, maintenance problems and the manual reset, with the result that there is no continuous failure to turn off so that reliability and stability of the device are improved.

What is claimed is:

1. A contactless device in an electric motor used in an electric car comprising
   a direct current electric motor having two oppositely wound series field coils and an armature connected to both said series coils,
   a first blocking diode connected to one end of one of said series field coils,
   a first main thyristor connected in series with said blocking diode,
   a second blocking diode connected to one end of the other of said series field coils, a second main thyristor connected in series with said second blocking diode, two serially connected capacitors connected to the anode of said thyristors, an auxiliary thyristor connected between the intermediate of the connection of said capacitors and the cathode of said main thyristors, a transformer and a reverse charging diode connected in series with each other and both connected in parallel with said auxiliary thyristor, a direct current source of power, the other end of said transformer connected to the negative terminal of said source, the other end of said armature connected to the positive terminal of said source, and two flywheel diodes connected to the positive terminal of said source and the anode of said blocking diodes, respectively.

2. A contactless device as set forth in claim 1, wherein when said first main thyristor is fired an electric circuit flows from said source through said armature, one of said series field coils, said first blocking diode, said first main thyristor, said transformer to said source, and wherein the potential of one of said capacitors is reversed by current flowing through the loop of said capacitor, said first main thyristor, said transformer, and said reverse charging diode thereby reversing the rotating direction of said electric motor.

3. A contactless device as set forth in claim 1, wherein when said second main thyristor is fired an electric circuit is formed from said source through said armature, the second of said series field coils, and second blocking diode, said second main thyristor, said transformer to said source and wherein the potential of said capacitor is reversed by current flowing through the loop of said capacitor, said second main thyristor, said transformer, and said reverse charging diode thereby reversing the rotating direction of the electric motor.

4. In a contactless device in an electric motor used in an electric car having an automatic resetting device for resetting upon failure of a thyristor control to turn off, said automatic resetting device comprising a direct current electric motor having two oppositely wound series field coils and an armature connected to both said series coils, a first blocking diode connected to one end of one of said series field coils, a first main thyristor connected in series with said first blocking diode, a second blocking diode connected to one end of said other series field coils, a second main thyristor connected in series with said second blocking diode, two serially connected capacitors connected between said thyristors at the anodes thereof, an auxiliary thyristor connected between the intermediate connection point of said capacitors and the cathodes of said main thyristors, a transformer and a reverse charging diode connected in series with each other and also connected in parallel with said auxiliary thyristor, a direct current source of power, said transformer connected to the negative terminal of said source, and said armature of said electric motor connected to the positive terminal of said source, a first flywheel diode connected between the positive terminal of said source and the anode of said first blocking diode, a second flywheel diode connected between the positive terminal of said source and the anode of said second blocking diode, a control pulse generator having first, second and third output terminals wherein said first terminal is connected for firing said first main thyristor, said second terminal is connected for firing said second main thyristor and said third terminal is connected for firing said auxiliary thyristor, a relaxation oscillator having first, second and third output terminals wherein said first terminal is connected for firing said first thyristor, said second output terminal thereof is connected for firing said second thyristor, and said third terminal thereof is connected for firing said auxiliary thyristor, and a detector having two input terminals which are connected to the respective anodes of said main thyristors and one output terminal which is connected to said relaxation oscillator.

5. A contactless device in an electric motor comprising:

a direct current electric motor having two oppositely wound series field coils and an armature connected to both of said series coils, a first thyristor connected in series with one of said field coils, a second thyristor connected in series with the other of said series field coils, first and second serially connected capacitors, one terminal of each of said first and second capacitors forming a common terminal, the other terminal of the first capacitor being connected to the anode of the first thyristor and the other terminal of the second capacitor being connected to the anode of the second thyristor, means for charging and discharging said capacitors, and failure detection means and automatic reset means said reset means responsive to said failure detection means.

6. A contactless device in an electric motor comprising:

a direct current electric motor having two oppositely wound series field coils and an armature connected to both of said series coils, a first thyristor connected in series with one of said field coils, a second thyristor connected in series with the other of said series field coils, first and second serially connected capacitors, one terminal of each of said first and second capacitors forming a common terminal, the other terminal of the first capacitor being connected to the anode of the first thyristor and the other terminal of the second capacitor being connected to the anode of the second thyristor, and means for charging and discharging said capacitors connected to said common terminal of said first and second capacitors whereby said first capacitor is connected across said first thyristor through said means for charging and discharging for turning OFF said first thyristor and said second capacitor is connected across said second thyristor through said means for charging and discharging for turning OFF said second thyristor.

7. The device of claim 6, wherein said means for charging and discharging said capacitors includes an auxiliary thyristor connected to the common terminal of said first and second capacitors.

* * * * *